Figure 6:
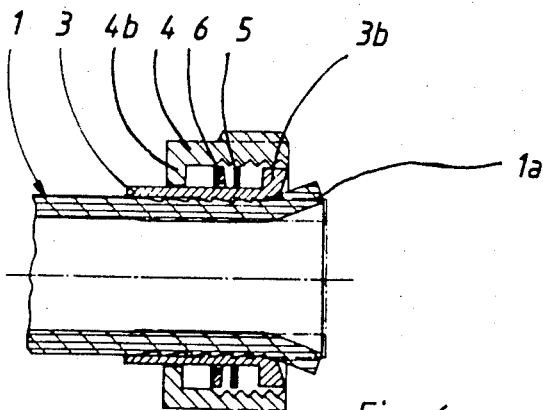

United States Patent [19]

Bürli

[11] Patent Number: 4,809,418
[45] Date of Patent: Mar. 7, 1989

[54] APPARATUS FOR APPLYING A COUPLING CONNECTOR TO A PLASTIC LIQUID-CONVEYING MEMBER

[75] Inventor: Kurt Bürli, Buus, Switzerland

[73] Assignee: J. & R. Gunzenhauser AG, Sissach, Switzerland

[21] Appl. No.: 126,861

[22] Filed: Nov. 30, 1987

Related U.S. Application Data

[62] Division of Ser. No. 901,017, Aug. 28, 1986, Pat. No. 4,735,442.

[30] Foreign Application Priority Data

Sep. 13, 1985 [CH] Switzerland ........................ 3972/85

[51] Int. Cl.$^4$ ............................................. B23P 19/04
[52] U.S. Cl. ...................................... 29/237; 29/512; 29/523; 29/243.52
[58] Field of Search ............ 29/237, 235, 272, 243.52, 29/512, 523

[56] References Cited

U.S. PATENT DOCUMENTS

| 112,958 | 3/1871 | Ramp . | |
|---|---|---|---|
| 482,593 | 9/1892 | Smith | 29/237 |
| 533,150 | 1/1895 | Trethewey et al. | 285/246 |
| 1,094,978 | 4/1914 | Church | 29/237 |
| 1,512,298 | 10/1924 | Mueller | 285/386 X |
| 1,848,867 | 3/1932 | Callaway | 29/237 |
| 2,060,860 | 11/1936 | Flynt | 29/237 |
| 2,165,621 | 7/1939 | Donahue et al. | 285/334.5 X |
| 2,191,582 | 2/1940 | Parker . | |
| 2,269,629 | 1/1942 | Kreidel | 285/122 |
| 2,444,622 | 7/1948 | Wolfram | 285/122 |
| 2,490,620 | 12/1949 | Cole et al. . | |
| 2,534,198 | 12/1950 | Guarnaschelli . | |
| 2,726,104 | 12/1955 | Boitnott et al. . | |
| 2,821,775 | 2/1958 | Pavelka | 29/237 |
| 2,926,027 | 2/1960 | Marquis . | |
| 3,030,253 | 4/1962 | St. John et al. . | |
| 3,191,971 | 6/1965 | Somers . | |
| 3,237,974 | 3/1966 | Press . | |
| 3,393,439 | 7/1968 | Shriver | 29/235 X |
| 3,479,058 | 11/1969 | Chandler . | |
| 3,599,310 | 8/1971 | Brownlee | 29/237 |
| 3,710,428 | 1/1973 | Bjalme et al. | 29/237 |
| 3,729,791 | 5/1973 | Theobald | 29/157 R |
| 3,764,169 | 10/1973 | St. Clair . | |
| 3,955,835 | 5/1976 | Farrington | 285/386 X |
| 4,116,477 | 9/1978 | Wahoski | 285/386 X |
| 4,128,264 | 12/1978 | Oldford . | |
| 4,170,125 | 10/1979 | Minko | 29/237 |
| 4,296,949 | 10/1981 | Muetteries et al. | 285/386 X |
| 4,408,381 | 10/1983 | Kish | 29/237 |
| 4,452,473 | 6/1984 | Ruschke | 285/386 X |
| 4,476,618 | 10/1984 | Simonson | 29/237 UX |

FOREIGN PATENT DOCUMENTS

| 681755 | 3/1964 | Canada . | |
|---|---|---|---|
| 2062303 | 5/1972 | Fed. Rep. of Germany . | |
| 3129204 | 2/1983 | Fed. Rep. of Germany . | |
| 364319 | 5/1906 | France . | |
| 712765 | 10/1931 | France . | |
| 956310 | 1/1950 | France | 29/237 |
| 1146949 | 11/1957 | France . | |
| 2245896 | 4/1975 | France . | |
| 740717 | 11/1955 | United Kingdom | 285/246 |

Primary Examiner—Charlie T. Moon
Attorney, Agent, or Firm—Ralph W. Selitto, Jr.

[57] ABSTRACT

A coupling sleeve (3) pushed onto the plastic pipe (1) and provided with barbs (3a) is drawn over a driving shoulder against the connecting piece (2) by a union nut (4). The opened-out pipe end (1a) is clamped between a curved end face of the connecting piece (2) and the coupling sleeve (3). Possible leakages caused by the flow of the pipe material are prevented by a spring (6), and the pipe (1) is prevented from turning during assembly by a sliding ring (5). The device used for assembling the pipe connection has grips (13) for fixing the pipe in position with a toggle lock (16) and a press ring (26), which can be displaced in sliding manner on a stop (25) acting as a centering arbor, and can be actuated by a hand lever (31). With only a few manipulations, the coupling sleeve (3) can be pushed onto the centrally held plastic pipe (1). Owing to the omission of the supporting sleeve required hitherto, the through-flow cross-section of the plastic pipe (1) is not reduced by the installation of this pipe connection. Heating up the end of the plastic pipe is no longer necessary during assembly. The pipe connection, which can be made cost effectively, is uncomplicated in its construction and absolutely liquid-tight.

13 Claims, 6 Drawing Sheets

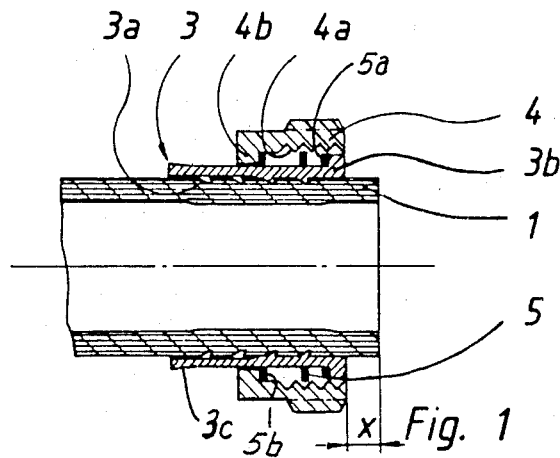
Fig. 1
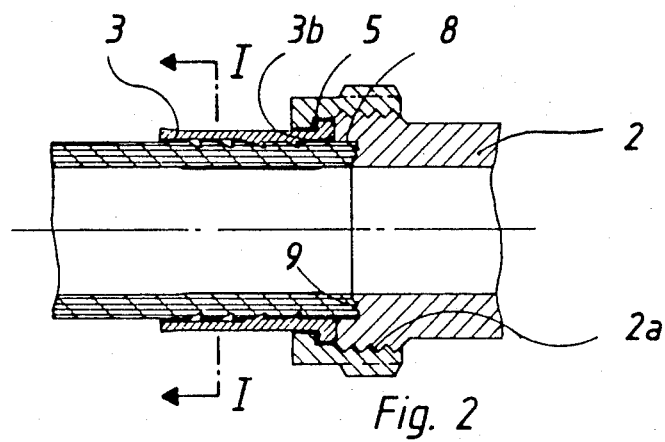
Fig. 2
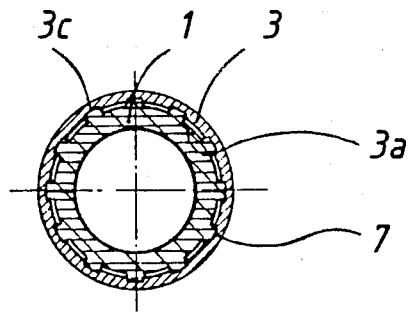
Fig. 3 (I-I)

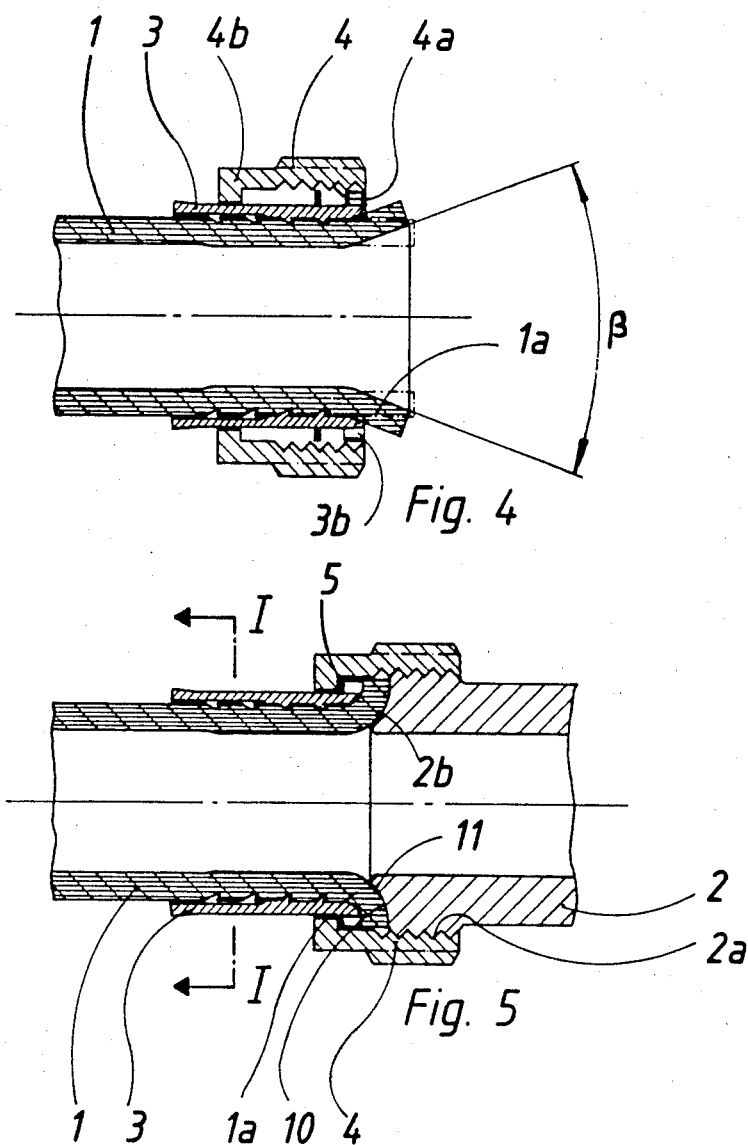

4,809,418

APPARATUS FOR APPLYING A COUPLING CONNECTOR TO A PLASTIC LIQUID-CONVEYING MEMBER

This is a division of application Ser. No. 901,017, filed Aug. 28, 1986, now U.S. Pat. No. 4,735,442.

A fact known to every expert in drinking-water installation technology is that the metal pipes previously used almost exclusively have in recent years also been increasingly replaced by plastic pipes for drinking-water installation systems. There is a good reason for this: on the one hand, the water conduit made of plastic, in particular of crosslinked polyethylene, is not subject to any kind of corrosion nor therefore to the dreaded pitting, whereas on the other hand—to mention only the most outstanding advantages—scarcely any flow noises develop and it has been possible to lay the conduit in a considerably simplified manner owing to the omission of complicated working operations.

It is the object of the present invention to propose a pipe connecting system which:
  does not involve any kind of reduction in the through-flow cross-section,
  does not cause any heating up of the pipe end during assembly and is therefore independent of external energy (power for a heating unit),
  because of its design, can be manufactured more cost effectively, installed in the simplest manner and released as often as desired.

This object is achieved by the invention defined in the patent claims, with the invention comprising on the one hand a method of constructing a liquid-tight connection between a plastic pipe and a connecting piece made of metal or plastic, and on the other hand a pipe connection made according to this method and also a device for assembling this pipe connection. Preferred embodiments are given in the dependent patent claims.

Figure 7:
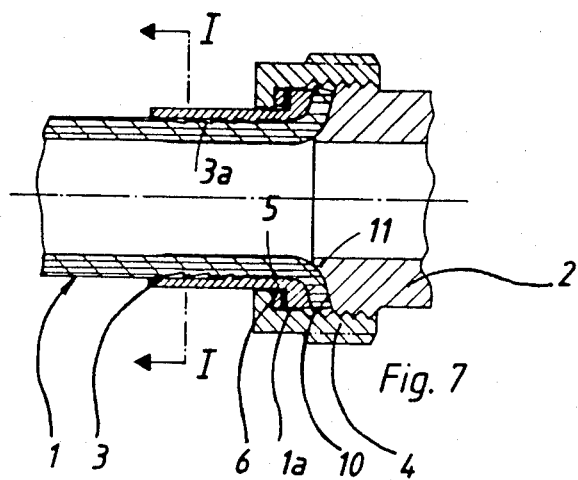
Figure 11:
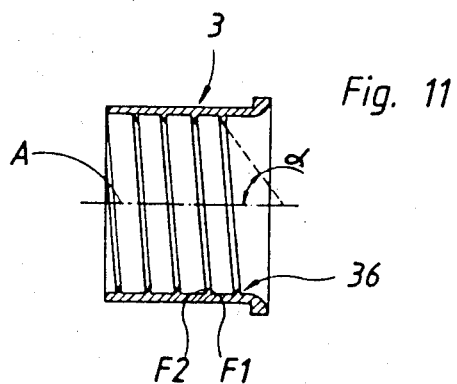
Figure 8:
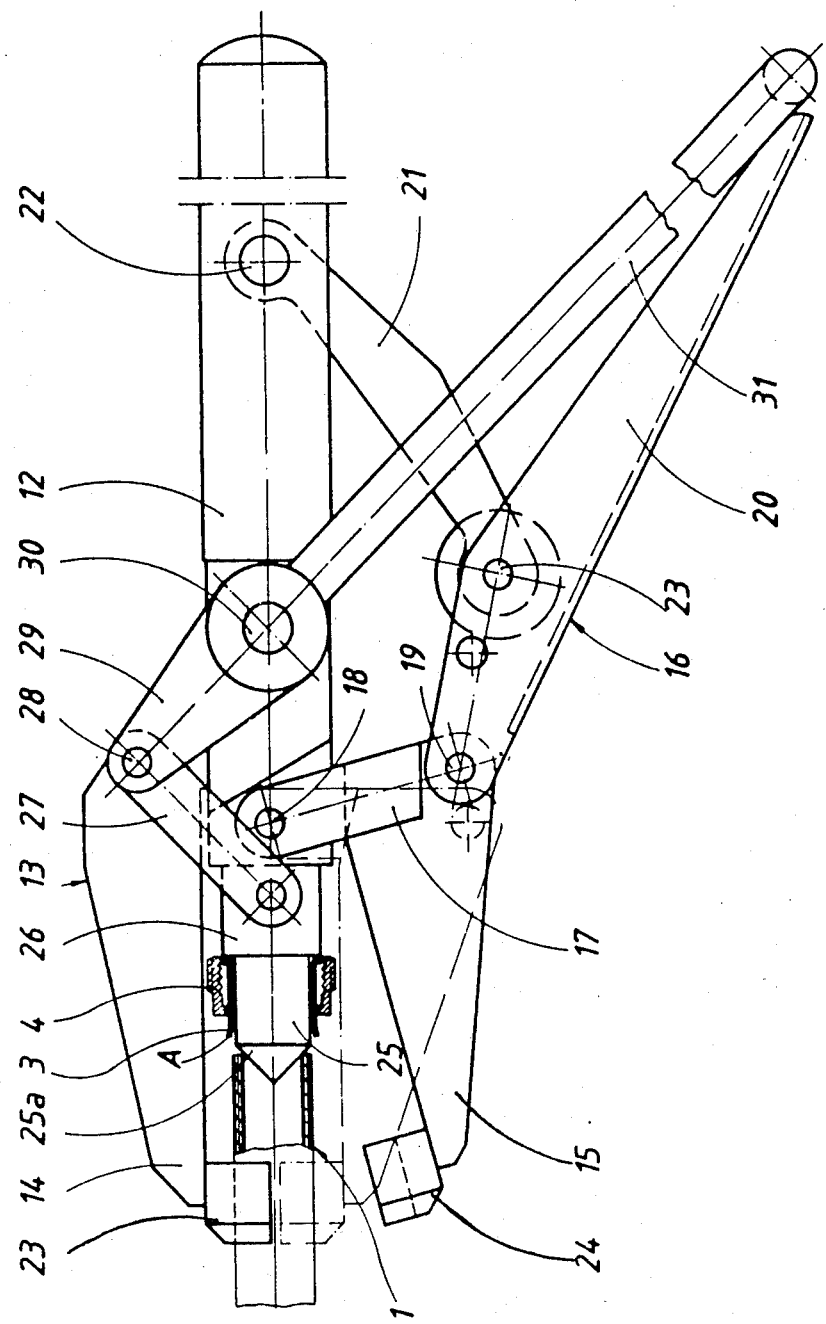
Figure 9:
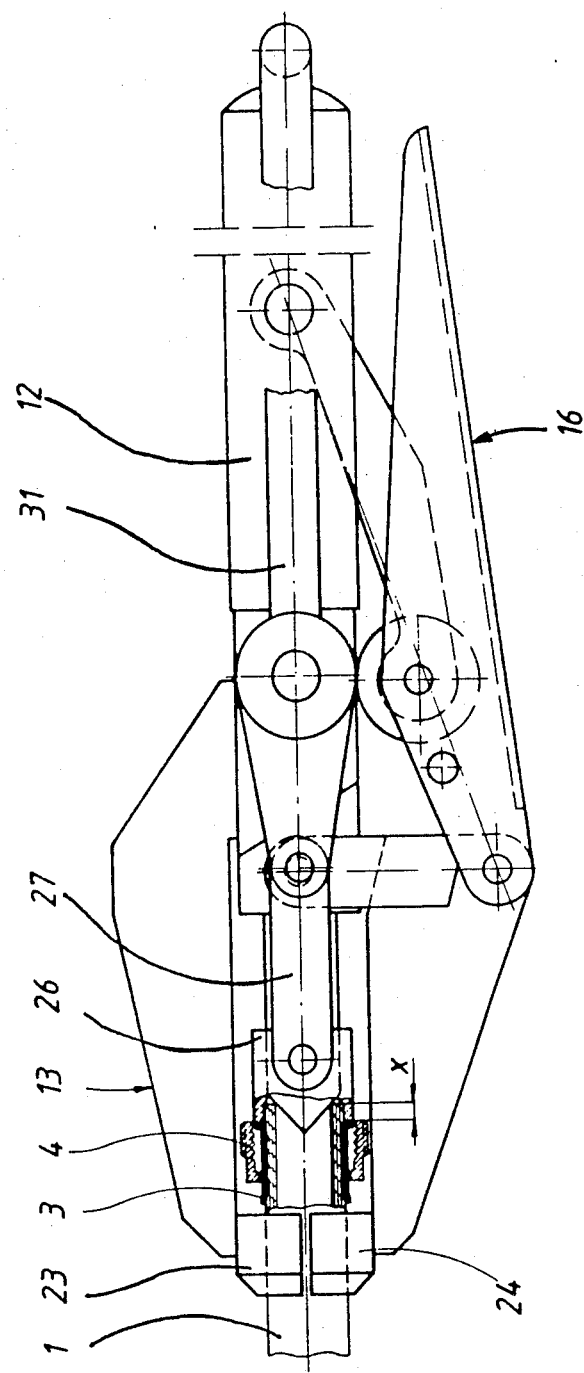
Figure 10:
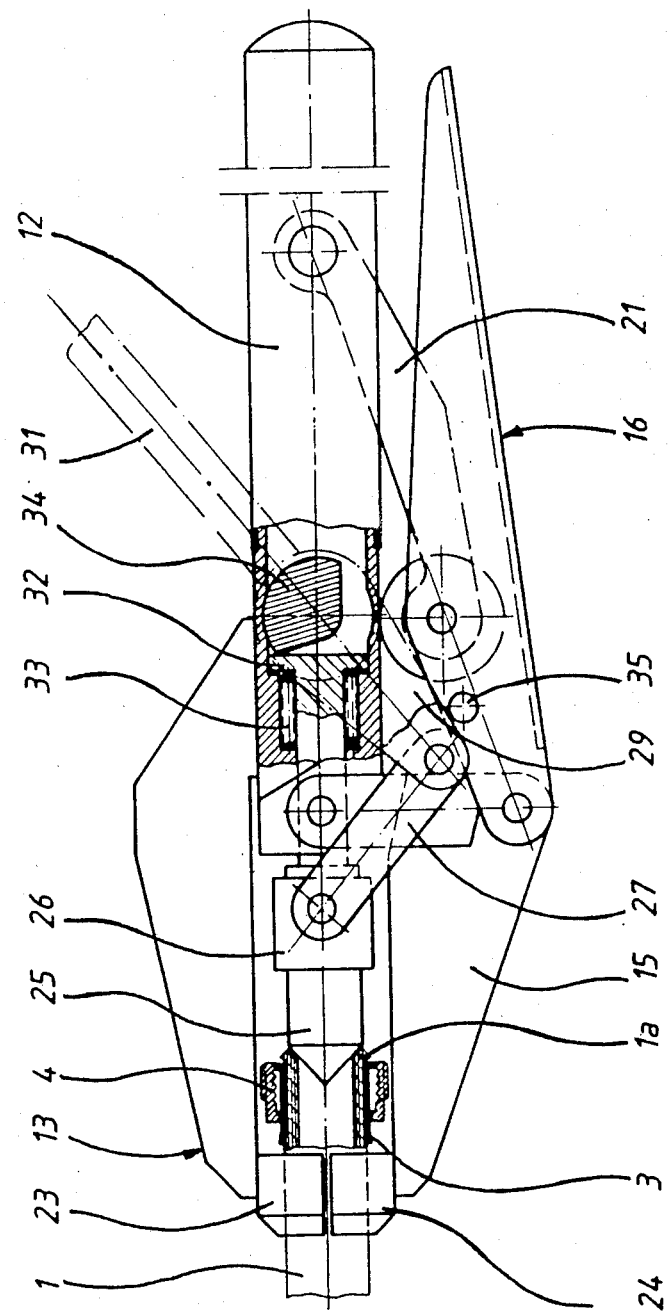

An exemplary embodiment of the subject matter of the invention is described below with reference to the attached drawings, in which:

FIG. 1 shows a sectional representation of the end portion of a plastic pipe after assembly of the driving sleeve, FIG. 2 shows the associated finished pipe connection, FIG. 3 shows a section along line I—I in FIGS. 2, 5 and 7, FIG. 4 shows a variant of the representation according to FIG. 1, FIG. 5 shows the associated finished pipe connection, FIG. 6 shows a further variant of FIG. 1, FIG. 7 shows the associated finished pipe connection, FIG. 8 shows a side view, partly in section, of the device used for assembling the pipe connection (assembly phase 1), FIG. 9 shows a side view of the same device in another operating position (assembly phase 2), FIG. 10 shows a further, partly cut away view of this device (assembly phase 3), and FIG. 11 shows a design detail.

According to FIG. 1, an unslotted coupling sleeve 3 is located on the periphery of a plastic pipe 1 which is preferably made of crosslinked polyethylene, which coupling sleeve 3 has been pushed axially onto the plastic pipe 1 in a manner yet to be described. The coupling sleeve 3, preferably made of brass, has an unslotted cylindrical base body which has a number of inwardly directed, barb-like teeth 3a and also—on its end face facing the pipe end—a radially outwardly projecting integrally formed portion which, on account of its function, is designated as coupling member 3b. The coupling member 3b can be made as either a continuous annular flange (see FIGS. 1, 2, 6 and 7), or in the form of individual driving dogs at a distance from one another (see FIGS. 4 and 5). The end of the sleeve 3 opposite the coupling member 3b has a flared rim 3c adapted to perform a function which will be described hereinafter.

A union nut 4 is located on the periphery of the coupling sleeve 3 shown in FIG. 1, which union nut 4 is of such a size that its internal thread 4a can be pushed over the coupling member 3b, while the radially inwardly projecting annular shoulder 4b can be displaced in sliding manner on the outer periphery of the coupling sleeve 3. The flared rim 3c inhibits the inadvertent removal of the nut 4 from the sleeve 3, whereby the nut 4 can be applied to the plastic pipe 1 together with the sleeve 3.

Moreover, it is important that the coupling sleeve 3, during its assembly, is pushed onto the plastic pipe 1 until its front end face is located at a distance x from the end face of the pipe 1.

The connecting piece 2, which can be seen on the finished pipe connection according to FIG. 2 and, for example, can be part of a fitting, has an external thread 2a corresponding to the internal thread 4a of the union nut 4 and, moreover, is provided on its end face with a cylindrical locating bore 8 into which the end 9 of the plastic pipe 1 projects.

During the assembly of the pipe connection, the coupling sleeve 3, together with the union nut 4, and preferably with the interposition of a friction-preventing sliding ring 5, is first of all pushed onto the plastic pipe 1 until the distance x is reached. The union nut 4 is then screwed onto the connecting piece 2, with the annular shoulder 4b of the union nut 4 drawing the coupling sleeve 3 via its coupling member 3b against the connecting piece 2. At the same time, the pipe end 9 is drawn into the locating bore 8 of the connecting piece 2 so that an excellent seal results. The sliding ring 5, which is made, for example, of Teflon or another low-friction material, prevents the pipe 1 from turning when the union nut 4 is tightened. Moreover, the coupling member 3b could be provided with an anti-friction lining 5a and/or the annular shoulder 4b could be provided with an anti-friction lining 5b.

To prevent the coupling sleeve 3 from turning on the plastic pipe 1, the sleeve is provided with wedge-shaped grooves 7, as shown in the sectional representation according to FIG. 3.

In the variants shown in FIGS. 4 and 5, and FIGS. 6 and 7, the reference numerals already introduced for designating the individual parts of the pipe connection have been retained. Differing from the embodiment according to FIGS. 1 and 2, FIGS. 4 and 5 show a connecting piece 2 with a curved end face 2b. In this variant, as FIG. 4 shows, the front end of the plastic pipe 1 is slightly flanged (flanging angle β) after the driving sleeve is pushed on, so that, when the union nut 4 is tightened, the pipe end is radially deflected in interaction with the curved surface 10, and the deflected pipe portion, now directed radially outwards, is clamped between the coupling sleeve 3 and the connecting piece 2. owing to the sealing surface increased in this manner, the sealing effect is further improved compared with the embodiment of FIGS. 1 and 2: in addition, any axial extraction forces which occur are absorbed.

The inner edge 11 of the connecting piece 2 is preferably rounded off. Instead of the curvature shown, the end face 2b can also have another appropriate form and, for example, run conically.

As endurance tests have shown, the previously described embodiments of the pipe connection according to the invention generally work satisfactorily. However, leakages can occur in the course of time under alternating loading as a result of the continual transition from cold to hot water and vice versa, so that the pipe connection can start to drip. These leakages are not, as might be expected, to be attributed to slackening of the union nut 4; on the contrary, the plastic material of the pipe end starts to flow because of the relatively high clamping pressure. In order to compensate for this flowing phenomenon, which leads to leakage, an elastic adjusting member, for example a spring washer 6, is additionally inserted, preferably according to FIGS. 6 and 7, between the annular shoulder 4b of the union nut 4 and the coupling member 3b of the coupling sleeve 3. The leakage possibly associated with the flow of the pipe material is therefore automatically compensated by the elastic adjusting force of the spring washer 6.

The pipe connection explained in FIGS. 1 to 7 is expediently assembled by means of a device which is specially developed for this purpose and which will now be described on the basis of FIGS. 8 to 10. In this description, the design features are to be dealt with first and then the function of the device.

Three functional groups, interacting for a common purpose—to mount the driving sleeve correctly onto the plastic pipe—are arranged on a base body which henceforth, with respect to its function, is designated as holder 12.

Firstly, clamping grips, designated overall as 13, are provided ono the front holding portion, which grips have afixed leg 14, a moveably mounted leg 15 and, for actuating the latter, a toggle lock 16. The leg 14 of the grip is preferably made in one piece with the holder 12 and therefore forms the front, laterally slightly protruding extension of the latter. The leg 15 of the grips has a prolongation which acts as a guide link 17 and is coupled on the one hand to the holder 12 via a joint 18 and on the other hand to a clamping lever 20 via a joint 19. The clamping lever 20 is in turn connected to the holder 12 by means of a further guide link 21 and two joints 22 and 23. Therefore the leg 15 of the grips, together with the integrally formed guide link 17, the clamping lever 20 and the guide link 21, forms a toggle linkage by means of which the moveable leg 15 of the grips, when the clamping lever 20 is actuated, can be blocked in the closing position (FIG. 8) indicated in dot-and-dash lines.

At their free end, the two legs 13 and 15 of the grips each have a clamping jaw 23 and 24. The locating opening of the clamping jaws 23 and 24, where in the closing position, is selected such that they securely hold the plastic pipe 1 against any undesirable axial displacement.

The second functional group, the function of which is to bring about the pushing of the coupling sleeve 3 against the plastic pipe, comprises a stop 25 which is mounted in the holder 12 and acts as a centering arbor and which has a press ring 26 mounted displaceably on its periphery. The press ring 26 can be displaced via a connecting rod 27 and an arm 29 which is connected to the latter by means of a joint 28 and is extended beyond a fixed joint 30 by an actuating lever 31.

The connecting rod 27 and the arm 29 form a thrust crank which is of such a size that, in its extended position, it pushes the coupling sleeve 3 onto the plastic pipe 1 to an excess dimension x (FIG. 1 and 9).

The third functional group, which can be seen from FIG. 10, is intended to slightly initially open out (initial flanging) the pipe end 1a facing toward the stop 25 after the coupling sleeve 3 is pushed on. For this purpose, the stop 25 displaceably mounted in the holder 12 at its end facing away from the conical point 25a, is provided with a stop shoulder 32 which on the one hand acts as a spring plate for a compression spring 33 and on the other hand is held in constant contact with an eccentric 34 by this compression spring 33. The eccentric 34 is in turn rotatably connected to the axis of the joint 30 (FIG. 8) and is adapted in form and position in such a way that it displaces the stop 25 against the restoring force of the compression spring 33 only after the press sleeve 3 has been pushed onto the plastic pipe 1.

FIGS. 8 to 10 illustrate three phases of the assembly operation. According to FIG. 8, the clamping grips 13 are opened, the coupling sleeve 3 is pushed, together with the union nut 4, onto the centering arbor 25 and the plastic pipe 1, with its opening, sits on the conical centering point 25a. In this position of the pipe, the leg 15 of the clamping grips is now pressed against the pipe 1 and locked by means of the toggle lock 16.

The actuating lever 31 is now swung about the axis 30 in the anticlockwise direction until it has reached the position shown in FIG. 9, in which it lies practically coaxial to the holder 12. During this swivelling movement of the actuating lever 31, the press ring 26 on the stop 25, as already mentioned, is pushed forward and at the same time pushes in front of it the coupling sleeve 3 together with the union nut 4 until the coupling sleeve 3 has reached the desired position on the pipe 1. This end position of the press ring 26 is shown in FIG. 9.

To be noted here on the one hand is that pushing the coupling sleeve 3 onto the pipe 1 is facilitated by a slightly conical chamfering of the press sleeve opening, which is designated as A in FIG. 8. On the other hand, although the eccentric 34 has been turned along by the actuating lever 31, it has so far not yet been able axially to displace the stop 25 owing to its position and shaping.

As shown by FIG. 10, if the lever 31 is now moved beyond its coaxial position according to FIG. 9, the eccentric 34 pushes the stop 25 forward by a small extent into the plastic pipe 1 and thereby initially opens out the pipe opening, as desired.

In the final movement phase of the actuating lever 31, which is shown in FIG. 10, the arm 29 also strikes a release pin 35 arranged on the toggle lock 16, as a result of which the toggle lock is released and the plastic pipe 1 falls out of the clamping grips 13.

According to the exemplary embodiments described, the coupling sleeve 3 is provided on its inner side with inwardly projecting, annular barbs 3a which have the task of reliably anchoring the coupling sleeve 3 on the plastic pipe 1. At the same time, the coupling sleeve 3, under the effect of a tensile force engaging in axial action, is to drive along the plastic pipe 1 and on the other hand is to be secured if possible against turning on the plastic pipe.

It ought to be clear to the specialist that anchoring the driving sleeve on the plastic pipe can be achieved in the most varied manner. Thus it would be possible for example, inter alia, to make the annular barbs 3a in a threaded form, and in fact preferably in the form of an angular thread shown in FIG. 11. The profile of this thread, designated overall as 36, has a flank F1 which is practically at right angles to the sleeve axis A, and also a flank F2 inclined toward the axis A. The angle α of inclination of the flank F2 relative to the axis A can, for example, be between 30° and 70°; a preferred angular range is between 50° and 60°.

As shown in FIG. 11, the thread 36 is made as a sharply angular thread. To achieve the intended protection against turning, the pitch direction of the thread 36 should be opposite to that of the union nut 4. Therefore if the thread of the union nut 4 is right hand, the thread 36 of the coupling sleeve 3 is selected as left hand.

This embodiment of the coupling sleeve 3, is shown in FIG. 11, ought to be especially suitable, for example, for large nominal diameters. At the same time, it ought to be possible in many cases to screw the sleeve onto the end portion of the plastic pipe with a simple plier-like auxiliary tool—or even by hand—on which end portion it is then reliably anchored both in the axial direction and against turning.

A further type of attachment of the coupling sleeve 3 on the plastic pipe 1 could also consist in inwardly projecting resilient barbs being arranged on the inner side of the coupling sleeve 3. The sleeve could then be pushed by hand onto the end portion of the plastic pipe and would be secured by the resilient barbs.

Merely from the description of the function of the device according to the invention, it ought to have become clear—and this has been confirmed by numerous practical tests conducted under the most varied conditions—that, owing to the device according to the invention, the pipe connection can be realized in an uncomplicated manner within the shortest time without prior heating up of the pipe.

The bore of the coupling sleeve 3 may be in the region of its free end also be beveled, so that the plastic tube protrudes out of the sleeve bore, but not beyond the end face of the sleeve.

I claim:

1. Apparatus for applying a coupling connector, which includes a tubular sleeve, to a plastic liquid-conveying member, comprising holding means for holding said connector such that said sleeve extends around said holding means, aligning means on an end of said holding means for automatically aligning one end of said plastic liquid-conveying member with said connector in such a manner that said one end of said plastic liquid-conveying member and said sleeve are arranged substantially coaxially, clamping means for clamping said plastic liquid-conveying member against substantial movement in an axial direction, first moving means for moving said aligning means into engagement or further engagement with said one end of said plastic liquid-conveying member and pushing means for pushing said connector off of said holding means and onto said plastic liquid-conveying member in such a manner that said sleeve is spaced inwardly a predetermined distance from said one end of said plastic liquid-conveying member.

2. Apparatus according to claim 1, wherein said clamping means includes a stationary leg having first gripping means for gripping said plastic liquid-conveying member on one side thereof and a movable leg having second gripping means for gripping said plastic liquid-conveying member on an opposite side thereof.

3. Apparatus according to claim 2, further comprising moving means for second moving said movable leg toward and away from said stationary leg.

4. Apparatus according to claim 3, wherein said second moving means pivots said movable leg toward and away from said stationary leg.

5. Apparatus according to claim 4, wherein said second moving means includes a toggle lock.

6. Apparatus according to claim 5, wherein said holding means includes a centering arbor having a first end which is remote from said one end of said plastic liquid-conveying member and a second end which is proximate to said one end of said plastic liquid-conveying member.

7. Apparatus according to claim 6, wherein said aligning means includes a tapered element provided at said second end of said arbor.

8. Apparatus according to claim 5, wherein said pushing means includes a press ring slidably and reciprocally mounted on said arbor such that said press ring slides back and forth on said arbor.

9. Apparatus according to claim 8, further comprising actuating means for actuating the movement of said press ring, said actuating means including a pivotally mounted lever which is connected to said press ring by a thrust crank such that upon the pivotal movement of said lever said thrust crank moves from a non-extended position to an extended position to thereby move said press ring toward said second end of said arbor, whereby as said thrust crank is moved from said non-extended position to said extended position said connector is pushed by said press ring onto said plastic liquid-conveying member to such an extent that said sleeve is spaced said predetermined distance from said one end of said plastic liquid-conveying member.

10. Apparatus according to claim 9, further comprising opening means for automatically opening said clamping means after said connector has been pushed onto said plastic liquid-conveying member.

11. Apparatus according to claim 10, wherein said operating means includes a stop which is positioned on said toggle lock such that said thrust crank contacts said stop after said thrust crank reaches said extended position to thereby open said toggle lock and release said plastic liquid-conveying member from said clamping means.

12. Apparatus according to claim 11, wherein said lever includes a pivot which is coupled to an eccentric and wherein said first end of said arbor is urged toward said eccentric by a spring.

13. Apparatus according to claim 12, wherein said eccentric is sized and shaped such that after said connector is pushed onto said plastic liquid-conveying member but before said plastic liquid-conveying member is released from said clamping means said eccentric pushes said arbor into said one end of said plastic liquid-conveying member to such an extent that said one end of said plastic liquid-conveying member is flared by said tapered element.

* * * * *